Figure 1:
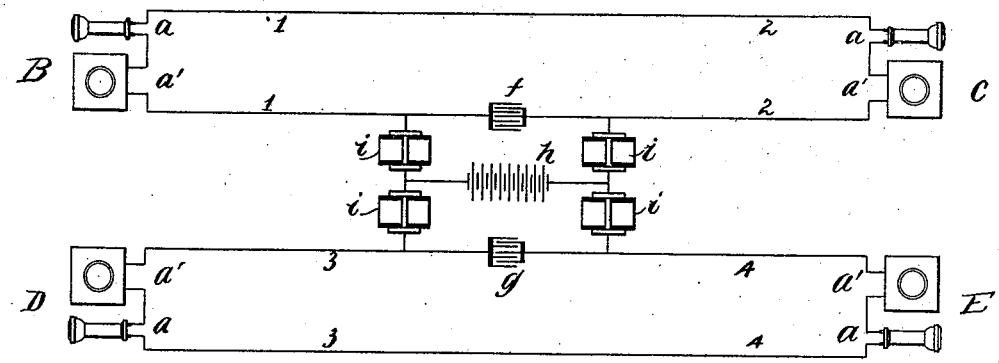

(No Model.)

C. E. SCRIBNER.
SYSTEM OF CURRENT DISTRIBUTION FOR SUBSTATION TELEPHONES.

No. 563,325. Patented July 7, 1896.

Witnesses:
George L. Cragg.
W. Clyde Jones.

Inventor:
Charles E. Scribner.
By Barton & Brown
Attorneys

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

SYSTEM OF CURRENT-DISTRIBUTION FOR SUBSTATION-TELEPHONES.

SPECIFICATION forming part of Letters Patent No. 563,325, dated July 7, 1896.

Application filed February 28, 1895. Serial No. 540,065. (No model.)

*To all whom it may concern:*

Be it known that I, CHARLES E. SCRIBNER, a citizen of the United States, residing at Chicago, in the county of Cook and State of Illinois, have invented a certain new and useful Improvement in Systems of Current-Distribution for Substation-Telephones, (Case No. 375,) of which the following is a full, clear, concise, and exact description, reference being had to the accompanying drawings, forming a part of this specification.

My invention relates to telephone-exchange systems in which the telephone-transmitters at the substations are supplied with current from a common source located at a central point. It concerns particularly the mode of supplying current to the transmitters in connected lines by a battery included directly in the circuit of the lines, its object being to prevent the propagation of telephonic disturbances between different pairs of connected lines including the common source of supply, while at the same time maintaining the highest efficiency of transmission between the members of each pair.

My invention consists in including in each completed telephonic circuit a condenser, and in connecting the common source of current supply in a parallel or shunt circuit with the condenser, and including impedance-coils in the circuit with the battery between its poles and the points of its connection with the telephone-circuit. In other words, the common source of supply is included in each complete telephonic circuit, together with two impedance-coils, the battery and impedance-coils being bridged or shunted as to telephonic currents by a condenser. Thus the common source of supply may be connected with each of several complete telephone-circuits, so as to supply current through each of them, while at the same time the independence or separation of the different circuits as to telephonic currents is maintained by the obstructive action of the impedance-coils in the different branches to the battery.

I am aware it is not new in the art of telephony to include a battery in a telephonic circuit for the purpose of supplying current to transmitters included serially in the circuit; but hitherto it has been necessary either to provide an individual battery in each telephonic circuit, as illustrated in Patent No. 252,986, to G. L. Anders, or, in the event of using a common source of current, to maintain the independence of the different circuits by providing individual return conductors for them, as exemplified in Patent No. 447,220, to A. C. White.

It will be apparent from the foregoing general description that in my invention the independence of the different lines as to telephonic currents is attained by means differing from the mode employed in either of these references mentioned, and that while employing a common source of current supply, the system may be used in connection with circuits which are grounded or have a common return conductor.

In practice in telephone-exchange systems, the connections of the condenser, the common battery, and the impedance-coils may be made with the loop conductor or plug-circuit by means of which different lines are temporarily united in the switchboard.

My invention is illustrated in the accompanying drawings.

Figure 2:
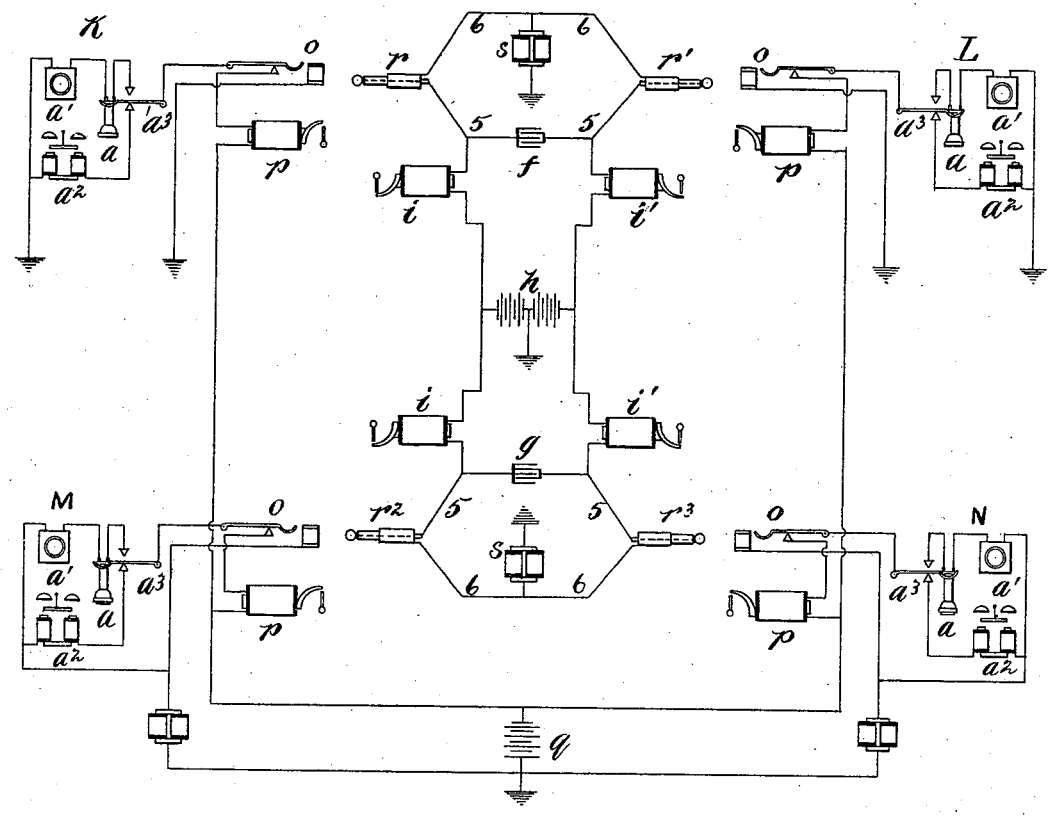

Figure 1 of the drawings displays in the simplest manner the essential circuit connections of four telephone-lines united in pairs, with a battery common to the lines for supplying current through them. Fig. 2 represents four telephone-lines provided with annunciators and terminating in spring-jacks on a telephone-switchboard, and pairs of connecting-plugs and their accessory circuits for uniting the different lines, the connections from the common battery being made through the medium of the plug-circuits.

In Fig. 1 a telephone-receiver $a$ and transmitter $a'$ are located at each of the stations B, C, D, and E. The instruments at stations B and C are included in a continuous metallic circuit 1 2, which includes also a condenser $f$. The instruments of stations D and E are likewise included in a circuit 3 4, containing a condenser $g$. These circuits are supplied with current from a battery or other source $h$ through branches from one pole of the battery to conductors 1 and 3, and from the other pole to conductors 2 and 4. Impedance-coils *i* are included in each of the branches from battery *h*. These impedance-coils may be of comparatively low resistance, but should have high impedance. It will be noted, that in so far as continuous current is concerned, the battery *h* is included serially in each of the telephone-circuits. At the same time the propagation of telephonic undulations between circuits 1 2 and 3 4 is prevented by the two impedance-coils *i* in each path between line conductors of the circuits. Battery *h* thus tends to set up a continuous current in each of the telephone-circuits 1 2 and 3 4. If sounds be made in one of the transmitters, as at station B, undulations are produced in this current by the variation of the resistance in the transmitter. Propagation of these undulations through the battery, or to the other telephone-line, is prevented by the impedance-coils *i*, but they are freely transmitted through condenser *f*, and hence reach and affect the receiving-telephone *a* at station C. Conversation may thus be carried on between stations B and C by means of the current supplied from battery *h*, but cross-talk or interference between the different circuits 1 2 and 3 4 is perfectly obviated.

In Fig. 2 other stations K L M N are represented, each provided with a telephone-receiver *a* and a transmitter *a'*, a signal-bell $a^2$, and a switch-hook $a^3$ for switching the telephone and the bell alternately into the circuit. The bell should be of high resistance as compared with the telephone, for the purpose of operating the signal. At the central station each line terminates in a spring-jack *o* and is connected through a signaling-annunciator *p* with a battery *q*, the spring-jack being arranged to disconnect the signaling-annunciator and the battery from the line when a plug is inserted into it. Lines to stations K and L are shown as grounded circuits; those to stations M and N as complete metallic circuits.

At the switchboard are provided a number of pairs of connecting-plugs $r\ r'\ r^2\ r^3$, for looping different line-circuits into connection with each other. The tips of the two members of a pair of plugs are connected by a conductor 5 and the sleeves by a conductor 6. The conductor 5 of pair $r\ r'$ includes a condenser *f*. The severed portions of conductor 5 are connected through impedance-coils *i* and *i'* with the two poles of the common battery *h*. Conductor 5 of plug-circuit $r^2\ r^3$ likewise includes condenser *g* and is similarly connected with the poles of battery *h*. The impedance-coils shown herein are provided with movable parts to adapt them for signaling, to indicate to the operator the discontinuance of current through them; and in order to render the two signals independent of one another, so that each may indicate the interruption of current in the telephone-line with which it is directly connected, the battery *h* is grounded near its center, and a ground branch including an impedance-coil *s* is made to conductor 6. The usual calling-keys may be provided in the plug-circuit for looping a generator of signaling-current into circuit with one of the plugs, together with listening-keys for connecting an operator's telephone-set with the circuit. These, being well known in the art, have been omitted from the drawings.

While telephone *a* rests upon the switch-hook $a^3$ at a substation, the circuit of battery *q* is practically interrupted at the high-resistance bell $a^2$. When the telephone is removed from the switch-hook for use, this circuit is closed through the comparatively low-resistance telephone *a* and transmitter *a'*, whereby the signal *p* is operated and attracts the attention of the attendant. The latter then inserts a plug, as *r*, into the corresponding spring-jack, and, having received the order, inserts the remaining plug into the spring-jack of the line called for. By the insertion of a plug into the spring-jack the circuit through annunciator *p* is interrupted and the latter returns to its normal position. A new signaling-circuit is now formed, however, extending from ground at the center of battery *h* through one-half of the battery, through one of the signals, as *i*, to the line, thence returning through a portion of conductor 6 of the plug-circuit and through impedance-coil *s* to earth. When both telephones have been removed from their switch-hooks, the battery *h* creates a current in the completed metallic circuit including the telephonic instruments at both the substations. Conversation is then carried on as described in connection with Fig. 1.

When the telephone at either of the connected substations is replaced upon the telephone-switch, the current through the completed line-circuit is interrupted and the signal *i* or *i'* adjacent to that line is displayed, signifying to the operator that that line is no longer in use; and when both signals have thus indicated the replacement of the telephones at the substations, connection between the lines may be broken by removing the plugs.

Having thus described my invention, I claim as new, and desire to secure by Letters Patent—

1. The combination with an electric circuit including serially a telephone-transmitter and a telephone-receiver at different stations, of a condenser in the circuit intermediate of the two stations, a source of electric current and an impedance-coil in a parallel or shunt circuit with the condenser, whereby current is supplied in the telephone-circuit for operating the telephone-transmitter.

2. The combination with two telephone-lines extending to different substations, each including serially at its substation a telephone-receiver and a telephone-transmitter, of link conductors uniting the telephone-lines, a condenser in one of the link conductors, and a source of electric current and an impedance-coil in shunt or parallel circuit with the condenser, whereby current for operating the substation-transmitters is supplied in the line-circuits, substantially as described.

3. The combination with two telephone-lines extending to different substations, each including serially at its substation a telephone-receiver and a telephone-transmitter, of link conductors uniting the telephone-lines, a condenser in one of the link conductors, a source of electric current in shunt or parallel circuit with the condenser, and an impedance-coil in the branch with the source of current, substantially as described.

4. In combination, several complete telephone-circuits, each including serially two telephone-transmitters and two telephone-receivers, a condenser in each circuit, a source of electric current, and branches permanently closed during the use of the telephones from the different sides of each condenser to the different poles of the battery, each of said branches including an impedance-coil, substantially as described.

5. In combination, two telephone-lines, each including serially a telephone-receiver and a telephone-transmitter at its substation and provided with a switch for interrupting the circuit when the line is not in use, link conductors uniting the corresponding sides of the two lines, a connection to earth from one of said conductors, a condenser in the other of said conductors, a source of electric current, branches from the different poles of said source of current to the different sides of the condenser, said branches having high self-induction, a signaling appliance in each branch, and a ground branch from the center of the battery, whereby the substation-telephones may be supplied with current and the signals actuated independently of each other when the substation-switches are operated.

In witness whereof I hereunto subscribe my name this 19th day of January, A. D. 1895.

CHARLES E. SCRIBNER.

Witnesses:
ELLA EDLER,
LUCILE RUSSELL.